INVENTOR.
ALFRED ANTON VILHELM FREDERIKSEN
BY
Mason, Fenwick & Lawrence
ATTORNEYS United States Patent Office 3,525,454
Patented Aug. 25, 1970

3,525,454
HERMETICALLY SEALED CONTAINER AND THE
METHOD OF MANUFACTURE
Alfred Anton Vilhelm Frederiksen, Gefionsvej 5,
Espergaerde, Denmark
Filed Oct. 4, 1968, Ser. No. 765,230
Claims priority, application Denmark, Oct. 6, 1967,
4,998/67; Sweden, Mar. 27, 1968, 4,106/68
Int. Cl. B65d 17/24
U.S. Cl. 220—53    5 Claims

ABSTRACT OF THE DISCLOSURE

Method of manufacturing a hermetically sealed plastic container with a readily openable plastic cover in which the cover is attached to the container by means of thermal sealing carried out by means of ultrasonic vibrations so as to form an annular welded seam which is easy to tear up, a weakening line formed by the separate manufacture of the cover and the container being provided along the welded seam on the outer and/or the inner side of same.

BACKGROUND OF THE INVENTION

It has hitherto not been possible in mass production to manufacture hermetically sealed containers wholly of plastic, since no tight welding could be obtained if the wall of such material exceeded comparatively small limits and the content of the plastic container should not be damaged by the heating. It is known to seal plastic containers by gluing, but this is a tedious affair and provides no perfectly safe sealing in automatic mass production. In many cases it is disadvantageous to use adhesives owing to the content of the container, in particular if this is foodstuffs.

It is not sufficient to provide a safe hermetical sealing of the container. It is equally necessary that the container can be opened very readily since, otherwise, it will be useless for most purposes as packing for ordinary consumer goods. Opening of such packings implies most frequently to use of tools such as, in particular, cutting or shearing tools; at the outmost, a coin or a similar generally available means comes in for consideration.

It is the object of the present invention to provide a method of manufacturing a hermetically sealed container, in which both the container itself and the cover are of plastic, and in which sealing may be readily and safely effected by thermal sealing, just as the portions may be separated from each other after assembly so as to provide access to the contents of the container.

According to the invention there is provided a method of manufacturing a hermetically sealed container consisting of a container portion of plastic having an opening and a cover portion of plastic. The container proper and the cover are formed in such manner as to provide sealing surfaces which are adapted to rest in contact with each other and have the form of closed annular rings extending around the opening of the container, weakening cavities having a comparatively sharp edge at the plane of the sealing surfaces being formed outside and/or inside the sealing surfaces, and after the container having been filled and the container and cover joined with the sealing surfaces resting in contact with each other, ultrasonic vibrations are imparted to at least one of the portions so as to produce a thermal sealing of the sealing surfaces.

By this novel method there is produced a welded annular seam which may be made of suitable width in relation to the fact that it is to be torn up later, and the welding operation may be performed by means of the heat produced between the sealing surfaces by the vibrations without injuring the plastic or the content of the container. Owing to the cavities and the sharp edge or edges at the sealing surfaces a weakening line is produced by the sealing seam by the actual construction of the container portions, which renders it easy to tear up the said seam for opening the cover, so that the tearing slit follows a predetermined path and forms a predetermined opening giving access to the content of the container.

The invention is also concerned with a hermetically sealed container consisting of a container portion of plastic and having an opening covered by a plastic cover, the container and the cover having sealing surfaces which abut each other and have the form of closed rings extending around the opening of the container, a circumferential cavity with a comparatively sharp edge at the plane of the sealing surfaces being formed outside and/or inside the sealing surfaces, and the sealing surfaces of the cover and the container proper being joined by ultrasonic sealing.

BRIEF DESCRIPTION OF THE DRAWING

An embodiment of a method and a container according to the invention will be described in the following with reference to the drawing, in which.

DESCRIPTION OF THE PREFERRED
EMBODIMENT

Figure 2:
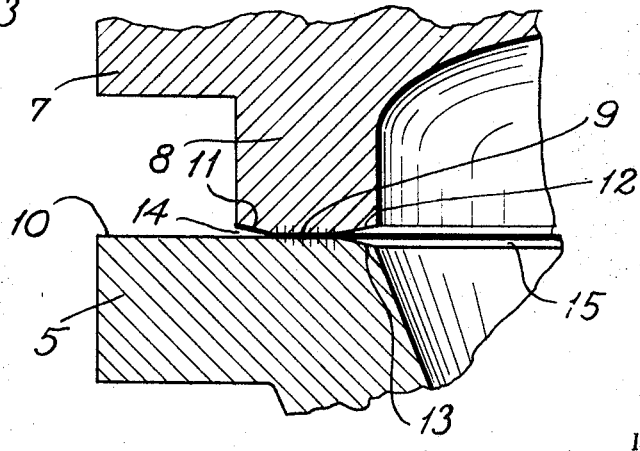
FIG. 2 is a part of FIG. 1 on a larger scale.

For a hermetically sealed container a container part 1 and a cover 2 therefor are each of them manufactured separately. The container has a flat bottom 3 and a wall 4 with an outwardly projecting flange 5 at its upper end. The cover 2 has a domed top plate 6 and a flange 7 which corresponds to the flange 5 and from which there emanates a tubular projection 8 with end surface 9 resting in contact with the surface 10 of the flange 5, FIG. 2. The tubular projection 8 has an outer inclined surface 11 which faces surface 10 and which intersects surface 10 at an acute angle as best shown in FIG. 2. The facing surfaces 10 and 11 define an outer groove 14 extending peripherally about the container. Similarly, the inner edge of projection 8 has an inclined inner surface 12 which is inclined with respect to the axis of the container and which intersects an inclined inner surface 13 of the container at an acute angle so that the facing surfaces 12 and 13 define an inner annular groove 15. The space between the grooves 14 and 15 constitutes an annular sealing surface which is provided in the manner set forth hereinafter. It should be noted that the intersection of surfaces 10 and 11 is immediately radially outward from the sealing surface whereas the intersection of surfaces 12 and 13 is immediately radially inward of the annular sealing surface.

Figure 1:
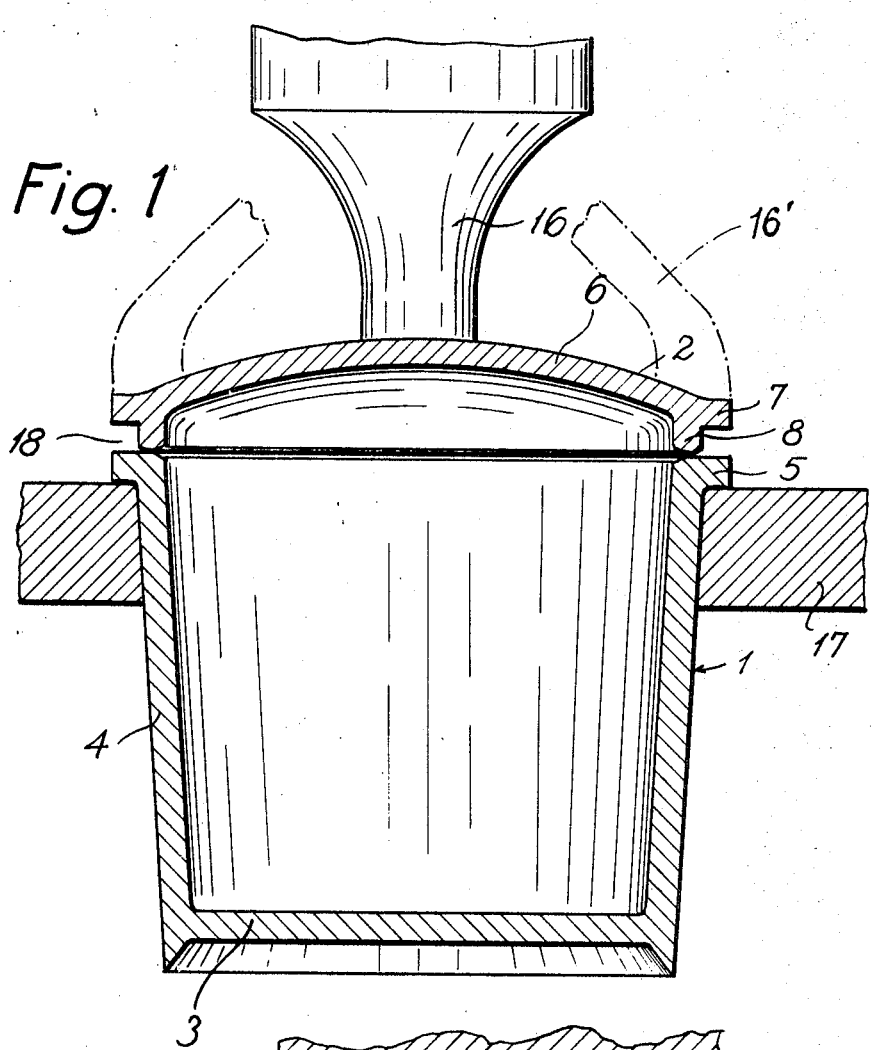
FIG. 1 is a side elevation of the container in section while being sealed.

When the container 1 has been filled with its contents, the cover 2 is placed as shown in FIGS. 1 and 2 and subjected to ultrasonic vibrations so as to provide thermal sealing between cover and container. The said welding may, for example, be carried out by means of a horn 16 which causes the domed top plate 6 to vibrate. The said vibrations of the top plate 6 produce in the peripheral part of the cover 2 vibrations and heat by which the annular area defined by the portion of surface 9 engaging surface 10 between the grooves 14 and 15 is heated to join the container top to the container surface 10 are heat sealed in such manner that the surrounding material is not decomposed, whilst hermetical sealing in the welded seam itself is obtained. If it is desirable not to transmit the vibrations to the container 1, and, in particular, not to its contents, the flange 5 may be supported by means of a matrix 17 having a big mess.

The ultrasonic vibrations may be imparted in other manner, for example, by a horn 16' connected directly with the peripheral part of the cover and imparting vibrations thereto, but the impartment of the vibrations has to be adapted to the form of the container and the demands made to the container, and the embodiment disclosed is thus only a single example.

As will appear from the figures, a circumferential groove 18 formed between the flanges 5 and 7 is suitable as a means for opening the container, since a part of some object, such as a coin, may be inserted into the groove 18 and thus assist in breaking the two flanges from each other and tearing up the welded seam. The further opening may, for example, be performed by repeating the said operation or by tearing up the seam, using the flanges as finger grips. The opening operation will not cause any trouble since the welding in itself constitutes a weakening line and the grooves 14 and 15 will regulate the tearing up so that this operation takes place exactly along the path intended.

While it is of essential importance that the welded seam is absolutely tight, its strength is of less importance in general, since in normal handling, on shipment and storing it is not exposed to actions that may involve that it is torn up. Accordingly, the ultrasonic vibrations are adjusted in such a way that the produced sealing seam can function satisfactorily as weakening or tearing line for the opening of the container.

I claim:

1. Method of manufacturing a hermetically sealed container consisting of a container portion of plastic material having an opening and a cover portion of plastic material for the container but which is removable from the container by tearing, characterized in that the container and the cover are formed in such manner as to provide sealing surfaces which are adapted to rest in contact with each other in an annular area extending around the opening of the container bordered by at least one weakening cavity having a comparatively sharp edge defined by the intersection of facing surfaces on the cover portion and container portion respectively at the plane of the sealing surfaces being formed outside and/or inside the sealing surfaces to enable tearing along the annular area after the container has been filled and joined with the cover with the sealing surfaces resting in contact with each other, in which ultrasonic vibrations are imparted to at least one of the said two portions so as to provide a thermal sealing of the sealing surfaces.

2. A hermetically sealed container comprising a container portion of plastic material with an opening and a cover portion of plastic material to cover same, characterized in that the container portion and the cover portion have sealing surfaces abutting each other along an annular area extending around the opening of the container, a circumferential outer groove defined by two facing surfaces respectively formed on said container portion and said cover portion which intersect each other at an acute angle radially outwardly adjacent said annular area wherein the sealing surfaces of the cover portion and the container portion are joined by ultrasonic sealing which can be subsequently separated to effect opening of the container.

3. Container as claimed in claim 2, characterized in that the container portion has an outwardly projecting flange extending outwardly from its opening, whereas the cover portion has a corersponding flange located at a distance from the flange of the container portion, one of the flanges having a tubular projection the outer periphery of which is located at a distance from the outer periphery of the flanges, whereas its end surface is resting in contact with the plane surface of the other flange with the area of contact comprising said annular area the projection and/or the flange having facing surfaces so that on one side or both sides of the abutting sealing surfaces there is formed a circumferential groove having a comparatively sharp bottom defined by the intersection of the facing surfaces which extend from the edge of the sealing surface.

4. The invention of claim 2 additionally including a circumferential inner groove defined by two facing surfaces respectively formed on said container portion and said cover portion which interset each other at an acute angle radially inwardly adjacent said annular area.

5. The invention of claim 4 wherein said facing surfaces on said cover portion are formed on the outer and inner edges of a tubular projection extending downwardly from said cover portion.

References Cited

UNITED STATES PATENTS

| 3,276,616 | 10/1966 | Lurie | 220—27 |
| 3,320,807 | 5/1967 | Taylor et al. | 156—73 X |
| 3,376,179 | 4/1968 | Balamuth | 156—73 |

FOREIGN PATENTS

| 1,018,514 | 1/1966 | Great Britain. |

GEORGE T. HALL, Primary Examiner

U.S. Cl. X.R.

156—73; 220—67